United States Patent [19]

Mokler

[11] Patent Number: 5,579,893
[45] Date of Patent: Dec. 3, 1996

[54] TRANSFER DEVICE FOR PRODUCTS, IN PARTICULAR CANS

[75] Inventor: Bernhard Mokler, Markgröningen, Germany

[73] Assignee: LTG Lufttechnische GmbH, Stuttgart, Germany

[21] Appl. No.: 488,577

[22] Filed: Jun. 8, 1995

[30] Foreign Application Priority Data

Dec. 19, 1994 [DE] Germany .................... 44 45 108.3

[51] Int. Cl.$^6$ .................................................. B65G 25/00
[52] U.S. Cl. ........................................... 198/430; 198/428
[58] Field of Search ........................... 198/418.6, 426, 198/428, 430, 432, 468.4

[56] References Cited

U.S. PATENT DOCUMENTS

| | | | |
|---|---|---|---|
| 2,217,982 | 10/1940 | Heil et al. | 198/430 |
| 2,452,376 | 10/1948 | Holstebroe et al. | 198/418.6 X |
| 3,776,342 | 12/1973 | Kulig et al. | 198/430 |
| 3,958,683 | 5/1976 | Schregenberger . | |
| 5,311,978 | 5/1994 | Kroon et al. | 198/428 |
| 5,339,944 | 8/1994 | Ostholt et al. | 198/430 |

FOREIGN PATENT DOCUMENTS

0563461A1  3/1992  European Pat. Off. .

*Primary Examiner*—James R. Bidwell
*Attorney, Agent, or Firm*—Hardaway Law Firm PA

[57] ABSTRACT

A transfer device for products, in particular aluminum cans, conveyed by a first transport system, which are transferred from the first transport system in groups in the form of a row aligned in the first transporting direction to a second transport system, wherein the placement of the products on the second transport system takes place in such a way that the row extends transversely in respect to its transporting direction. The transfer device includes a pickup mechanism holding the respective group of products during the transfer movement, the pickup mechanism being guided along a movement track by at least one drive linkage, wherein the drive linkage has a first arm which is pivotably connected at one end to a first shaft on the pickup mechanism and by its other end is pivotably connected to a second shaft on a rotating drive crank, and with a second arm, which is pivotably connected to a third shaft on the first arm and is pivotably connected to a fourth shaft, which is a fixed shaft. A first compensating weight is associated with the first arm.

20 Claims, 7 Drawing Sheets

TRANSFER DEVICE FOR PRODUCTS, IN PARTICULAR CANS

BACKGROUND OF THE INVENTION

The invention relates to transfer device for products, in particular aluminum cans, conveyed by means of a first transport system, which are transferred from the first transport system in groups in the form of a row aligned in the first transporting direction to a second transport system, wherein the placement of the products on the second transport system takes place in such a way that the row extends transversely in respect to its transporting direction. More particularly, the present invention relates to such a transfer device with a pickup mechanism holding the respective group of products during the transfer movement that is guided along a movement track by at least one drive linkage, wherein the drive linkage has a first arm which is pivotably connected at one end to a first shaft on the pickup mechanism and by its other end is pivotably connected to a second shaft on a rotating drive crank, and with a second arm, which is pivotably connected to a third shaft on the first arm and is pivotably connected to a fourth shaft, which is a fixed shaft.

The first transport system can be a belt, for example, on which the products are arranged in rows (in particular, single rows or double rows or several rows next to each other). The transfer device takes up respectively one section, i.e., a group, of this row or rows and transfers it to the second transport system on which the products are placed. Placement is performed with an alignment of the row or rows in such a way that the long direction of the row or rows extends transversely to the transporting direction of the second transport system. If, for example, the second transport system is also a belt, the row of products extends transversely, in particular perpendicularly, to the long extension of the belt. The products can be cans, for example, in particular beverage cans, whose exteriors are sequentially imprinted by a printing machine upstream of the first transport system and are then conveyed by means of the transport system to the transfer device. The transfer device rearranges the cans, received in groups, in such a way that they are placed on the second transport system in rows extending respectively parallel to each other, wherein the long extension of these rows lies transversely to the transporting direction of the second transport system. In this way the second transport system is provided with very densely placed products which, in case of the cans mentioned, are conveyed to a drying process, which may be continuous.

The transfer device is designed in such a way that by means of its pickup mechanism it receives products from the first transport system, wherein it moves along synchronously with the products during the pickup process, so that no or only a negligible relative movement between the products and the pickup mechanism occurs during the pickup process. This guarantees a positionally exact and therefore assured transfer at high speeds. The same applies to the depositing mode on the second transport system. Here, too, the pickup mechanism moves within a fixed movement track area synchronously or almost synchronously with the transporting means of the second transport system, so that positionally exact placement is possible without the products bumping into each other or falling over, etc. Since the transfer process must take place very rapidly because of the large number of products being delivered, it is necessary to keep the products very securely on the pickup mechanism because of the acceleration forces occurring during the transfer process. A vacuum holding device is preferably used for this; i.e., the products are attracted by suction from above and then transferred. It is not necessary for the pickup mechanism to change its position in height for this for it can move on one level. During pickup, it is sufficient for an attraction process if it is at a slight distance above the upper edges of the cans. Correspondingly the same applies for depositing, wherein the depositing process is achieved in that the vacuum is turned off and the products are released by this and deposited on the second transport system.

A transfer device of the above described type is known from European Patent Application 0 563 461. This known transfer device has the disadvantage that very high acceleration forces act on the machine frame during operation, resulting in uneven running not free of vibrations which, on the one hand, causes great stress on the material and, on the other, makes positionally exact pickup and deposit of the products difficult. In addition, pickup and deposit by means of a vacuum is not optimal in the device disclosed in that application.

Another similar transfer device is shown in U.S. Pat. No. 3,958,683. This transfer device also has the disadvantage of the very high acceleration forces that act upon the machine frame during operation. A motor or other driving force associated with this transfer device must be designed to provide the greatest acceleration necessary to accomplish the transfer, and also to overcome inertia forces when the direction of the transfer device movement is changed.

The transfer device of U.S. Pat. No. 5,311,978 recognizes this problem and, to allow use of a smaller motor for power, provides the drive means with a flywheel assembly. The flywheel provides counter-inertia to allow a smaller motor to suffice to overcome the inertia when the transfer device changes direction, and provides additional drive to boost acceleration when needed. Inclusion of the flywheel also requires additional moving parts in the transfer device.

Use of a smaller motor helps to reduce some of the stresses induced in the transfer device. However, there are still considerable forces acting upon the first and second arm, which result in vibration and stress of the transfer device.

SUMMARY OF THE INVENTION

It is therefore an object of the invention to address the above-mentioned disadvantages associated with operation of the transfer device. More particularly, it is an object of the present invention to provide a transfer device having reduced vibration and stress.

This object is attained in accordance with the invention by a first compensating weight being associated with the first arm. Quiet running of the moving parts of the transfer device is achieved by means of this step. The movement of the transfer device is distinguished by high acceleration and braking processes, since during the pickup operation it is necessary to move the pickup mechanism along synchronously with the first transport system, then the transfer movement to the second transport system takes place and, there again, the speed of the second transport system must be matched in turn. Following this, the pickup mechanism must be returned again to the first transport system where the process is correspondingly repeated. It is preferably provided for the transporting direction of the first transport system to extend transversely, in particular perpendicularly, to the transporting direction of the second transport system. The deposit levels of the two transport systems are arranged at the same height. Because a compensation weight has been associated with the first arm, the forces acting on the arms and other parts of the transfer device because of the dynamic movements are reduced or compensated, because of which it is possible to make the vibration-free machine frame correspondingly lighter, which saves material. Furthermore, because of the freedom from vibration, the positional exactness in respect to pickup and deposit of the products at the pickup mechanism is optimally assured. Because of this vibration-free running or running with reduced vibrations, the machine components and the support of the frame on the ground can be correspondingly lighter, so that costs are saved and the operational dependability is considerably increased.

In accordance with another aspect of the present invention, it is provided that a second compensating weight is also associated with the second arm. The above described circumstances are further improved by this. The special feature here is that it was recognized that the assignment of a compensating weight to the first and possibly also the second arm causes positive effects, wherein these locations in particular for disposing one or several compensating weights were selected from a variety of options.

Preferably, the first compensating weight is disposed on the first arm in the area of the second shaft.

It is advantageous in particular if the first compensating weight is embodied in the form of a cantilever on the first arm, wherein the cantilever extends transversely to the long direction of the first arm. The term "cantilever" is to be understood in view of the weight distribution on the arm; i.e., it is not absolutely necessary that a cantilever be physically formed, even though it is shown as such in the exemplary embodiment in the drawings. It is important that an appropriate mass is disposed laterally of the long extension of the first arm, so that this compensating weight is established. The actual physical shape of the first arm is not relevant.

It is further preferred that the first arm forms an angled arm together with the cantilever, wherein the second shaft is disposed in the corner area of the angle.

To cause an optimization it can be provided in particular that the mass of the first compensating weight can be adjusted by the addition or removal of weighted bodies. This also applies to the second compensating weight. In the same way it is possible to provide that, in connection with the first and/or second compensating weight, the position of the compensating weight or compensating weights can be adjusted by an adjustment arrangement in such a way that an optimal result can be obtained.

In a preferred manner, the second arm is extended beyond its fixed shaft and has a second compensating weight there. This can be disposed symmetrically in respect to the longitudinal center axis of the second arm.

The pickup mechanism is preferably embodied as a mechanism which attracts the products by means of a vacuum. This means that the products are attracted and held by means of suction during the transfer movement and, as soon as the second transport system has been reached, are released by turning off the vacuum and are set down. The control of the suction is performed by a suction control apparatus having a valve plate, such as in a butterfly valve, disposed in a vacuum line, which is controlled synchronously with the movement of the pickup mechanism. The vacuum line is closed or opened by this depending on whether the products are to be held (holding mode) or whether they are to be released (depositing mode). The valve plate is released depending on whether the products are to be held (holding mode) or whether they are to be released (depositing mode). The valve plate is preferably placed in an area of the vacuum line with a widened cross section. A bypass air flap is preferably coupled with the valve plate which, during the holding mode, closes off a ventilation opening and during the depositing mode opens the ventilation opening. It is assured by means of this that the vacuum is dissipated very rapidly during the change from a holding node to a depositing mode, so that the products are all released together as simultaneously as possible, preferably within milliseconds, and are deposited in correct alignment.

DETAILED DESCRIPTION OF THE PREFERRED EMBODIMENT

Figure 1:
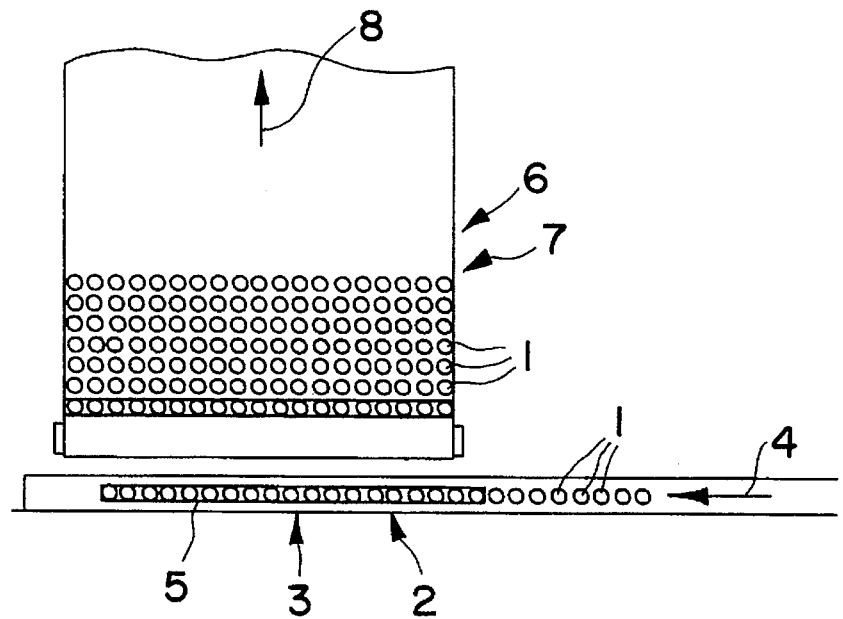
Fig. 1 is a schematic view of a first and a second transport system on which products are arranged.

Turning now to the drawings, and, more particularly to FIG. 1, a top view of a transfer area for products 1 is illustrated, wherein these products 1 are freshly painted tin or aluminum cans, such as are known in the beverage industry. The products 1 are conveyed in a row on a first transport system 2. The first transport system 2 preferably is embodied as a first belt 3. The products 1 therefore stand in a row on the belt and are conveyed in the direction of the arrow 4. The transport system 2 is oriented in the longitudinal direction of the row of products 1. A group 5 of the products 1 is grasped by means of a transfer device (not shown in FIG. 1) and is transferred to a second transport system 6. The group 5 is identified by a rectangle within which an appropriate number of products 1 is located.

The second transport system 6 comprises a second belt 7 moving in the direction of the arrow 8. The transfer device (not shown) transfers the group 5 in such a way that the products 1, arranged in it in rows, are oriented in transversely, in particular perpendicularly, extending rows in respect to the transporting direction 8 of the second transport system 6. It therefore becomes clear from Fig. I that, in the course of the transfer process, each one of the groups transferred from the first transport system 2 and deposited on the second transport system 6 results in parallel rows of products 1 being formed there. The width of the belt 7 preferably corresponds to the length of the group 5 and the transfer process takes place sufficiently rapidly and matched so that always exactly one group 5 of products 1 is available on the transport system 2 after the previous transfer process of a group 5 is terminated. The new group 5 is thusly transferred to the second transport system 6 in such a way that the individual rows deposited there are placed closely together, viewed in the transporting direction 8, but without the individual products 1 touching each other. It is possible in this way to achieve a very high density of products 1 on the second transport system 6.

Figure 2:
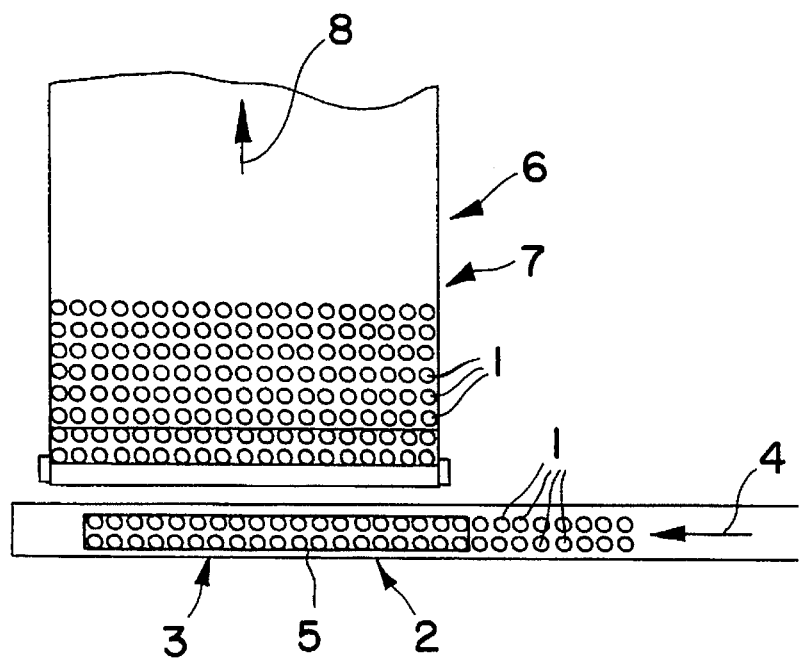
FIG. 2 is a variant corresponding to FIG. 1.

FIG. 2 shows a system corresponding to that of FIG. 1; wherein, however, two rows of products 1 extending parallel in respect to each other are conveyed on the first transport system 2. The transfer device, not shown, is designed in such a way that within a group 5 it always transfers two parallel rows of products 1from the first transport system 2 to the second transport system 6. In accordance with other exemplary embodiments (not shown), it is also possible to transfer three or even more parallel rows of products 1, in a manner similar to that described above.

Figure 3:
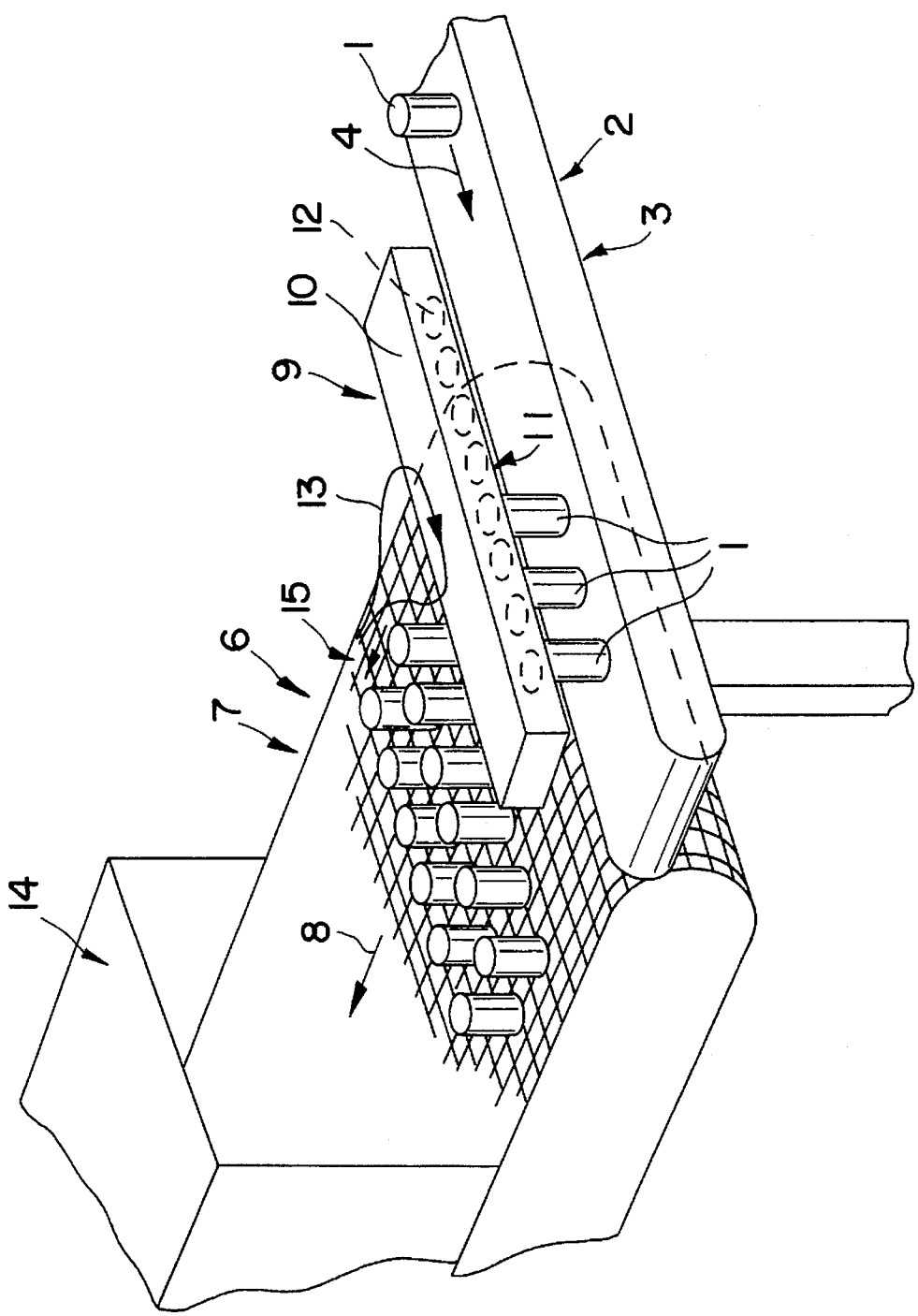
FIG. 3 is a schematic perspective view of the embodiment of FIG. 1.

A transfer device 9 is represented schematically in FIG. 3. It has a beam-shaped pickup mechanism 10 having suction slits 12 on its underside 11 facing the products 1, which are brought into a location opposite the products 1 of the first transport system 2. In the process, the transfer device 9 moves nearly synchronously with the movement of the products 1 on the first transport system 2, so that there is nearly no relative movement. Suction is generated in this state in the pickup mechanism 10, because of which the products 1are attracted and held on the underside 11 of the pickup mechanism 10. In the course of further operation, the pickup mechanism 10 moves on a curved track 13; i.e., it moves in the direction toward the second transport system 6 during which it assumes a speed corresponding to the transporting speed and transporting direction of the second transport system 6. Once the pickup mechanism 10 has reached the appropriate depositing position above the second transport system 6, the vacuum is shut off and the products 1 are released. They are then deposited in accordance with the orientation in rows on the belt 7 and in the direction of the arrow 8 enter a drying tunnel 14, for example. It can be seen from the further course of the curved track 13 that following the deposit, the pickup mechanism 10 stops for a brief time (point 15) and is then returned at an appropriate acceleration in order to again pick up products 1 from the first transport system 2. Thus the described process is cyclically repeated, in the course of which very high speeds are employed, for example up to approximately 1500 cans per minute (in a single row in accordance with FIG. 1 ). The number of cans which are transferred per minute also depends on the width of the second transport system 6. Because of the very quiet running of the transfer device 9, which will be discussed in detail below, it is possible to transfer a larger number of cans per unit of time in contrast to the known transfer devices. The curved track 13 of the pickup mechanism 10 is achieved by means of a drive linkage 16, shown schematically in FIG. 4. Two identically constructed drive linkages 16 are shown therein which, along the longitudinal extent of tile beam-shaped pickup mechanism 10, alternately engage one or the other end of this pickup mechanism 10. The two drive linkages 16 are synchronized in respect to their movements and are embodied to operate in the same sequence. Therefore the design of only one drive linkage 16 will be discussed in what follows. The statements apply in a corresponding manner to the other drive linkage 16.

The drive linkage 16 has a first arm 17, whose one end 18 is pivotably connected with the pickup mechanism 10 by means of a first shaft 19. The other end 20 of the first arm 17 is pivotably connected by means of a second shaft 21 with a rotating drive crank 22 which is embodied as a wheel 24 rotating in a bearing 23 fixed on the machine. The circle of rotation of the second shaft 21 is identified by the reference numeral 30 in FIG. 4.

A third shaft 26 is embodied on the first arm 17 in approximately the center section between the first shaft 19 and the second shaft 21, by means of which a second arm 27 is pivotably connected to the first arm 17. The top view of FIG. 4 clearly shows that the third shaft 26 is located to the left of an imaginary connecting line between the first shaft 19 and the second shaft 21. The second arm 27 is pivotably seated by means of a bearing fixed on the machine; i.e., the bearing constitutes a fixed shaft identified as the fourth shaft 28 in what follows. It follows from FIG. 4 that the second arm 27 is embodied to extend beyond the fourth shaft 28. This extension is identified by the reference numeral 29.

It can be seen from the above that, when the drive crank 22 is turned in the direction of the arrow 30, the pickup device 10 will make a corresponding movement with the aid of the first arm 17 acting as a coupling. This movement is restrictedly guided by the second arm 27 so that as a result the curved track 13 is formed by this. Two positions of the drive linkage 16 have been illustrated in FIG. 4 to make this movement clear, one position by a solid line and a further position by a dashed line. The position indicated by the solid line corresponds to a pickup position; i.e., in this position the pickup device 10 takes on products 1 from the first transport system 2. The position indicated by the dashed lined corresponds to a pull-down position; i.e. the products 1 have been transferred to the second transport system 6 and are deposited there in this position.

Figure 6:
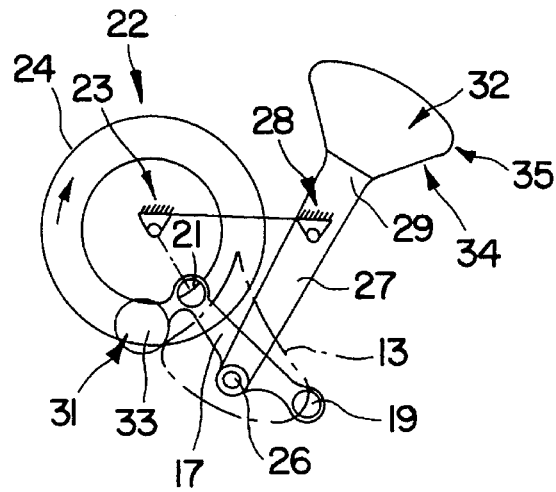
FIGS. 6–8 are sequential plan views of the elements of the transfer device of FIG. 4.
Figure 7:
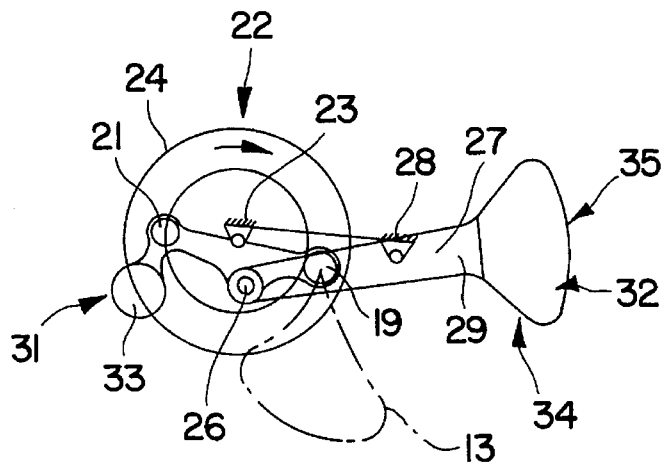
Figure 8:
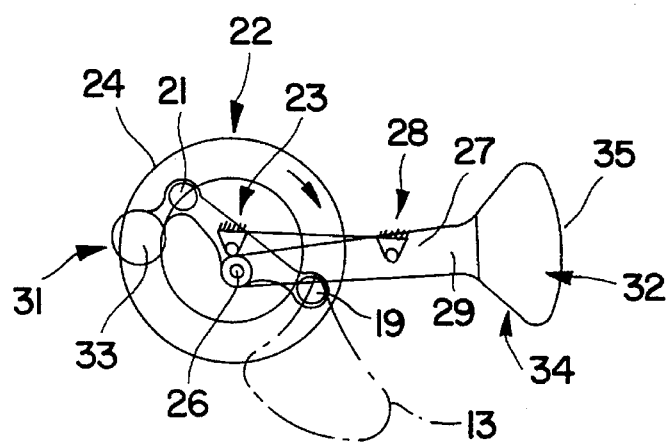

The various positions have again been clearly shown by means of FIGS. 6 to 8, wherein the curved track 13 has also been illustrated in the drawing figures, so that the above described transfer movement of the products 1 becomes particularly clear from this.

It is essential for the quiet, vibration-free running of the transfer device 9 that a first compensating weight 31 is associated with the first arm 17 and/or a second compensating weight 32 with the second arm 27. The drawings show that the first compensating weight 31 is disposed in the area of the shaft 21. In view to its supporting capability for receiving further masses, it is cut in one piece with the first arm 17 from an appropriate plate of material when the first arm 17 is cut out, i.e., by laser cutting. The compensating weight 31 forms a cantilever 33, wherein in accordance with FIG. 6 the cantilever 33 extends to the left of the longitudinal axis of the first arm 17, if the arm 17 is viewed as starting from the first shaft 19 and extending toward the second shaft 21. A platform is created by means of the cantilever 33 formed in this way which, in case the weight of this platform is insufficient as a compensating weight, constitutes a receptacle for attaching further weights of an appropriately desired shape. For example, these weights can be plate-shaped circular disks which can be arranged there by suitable fastening means. The desired compensating weight can be adjusted by adding or removing weights. Furthermore, in a manner not shown, adjusting means for moving the position of the compensating weights can be provided, by means of which exact compensation can take place. These adjusting means can be formed by rows of holes, for example, which permit the shifting of the appropriate compensating weights, and wherein appropriate threaded connectors extend through the holes in the rows. In place of the rows of holes it is also possible to provide elongated holes, so that the release of a clamping means allows shifting of the corresponding compensating weights wherein, as soon as the desired position has been reached, the position of the compensating weights selected in this way can be fixed by clamping the clamping means in place.

What has been said above applies in a corresponding manner for the second compensating weight 32. This means that the arm 27 has been made, for example, from a plate-shaped material by laser cutting and because of this a sort of receiving platform 35 is formed in the area of its extension 29 on which further compensating weight can be placed, if required. Appropriate position changing elements are provided here, too, as described in connection with the first compensating weight.

Figure 4:
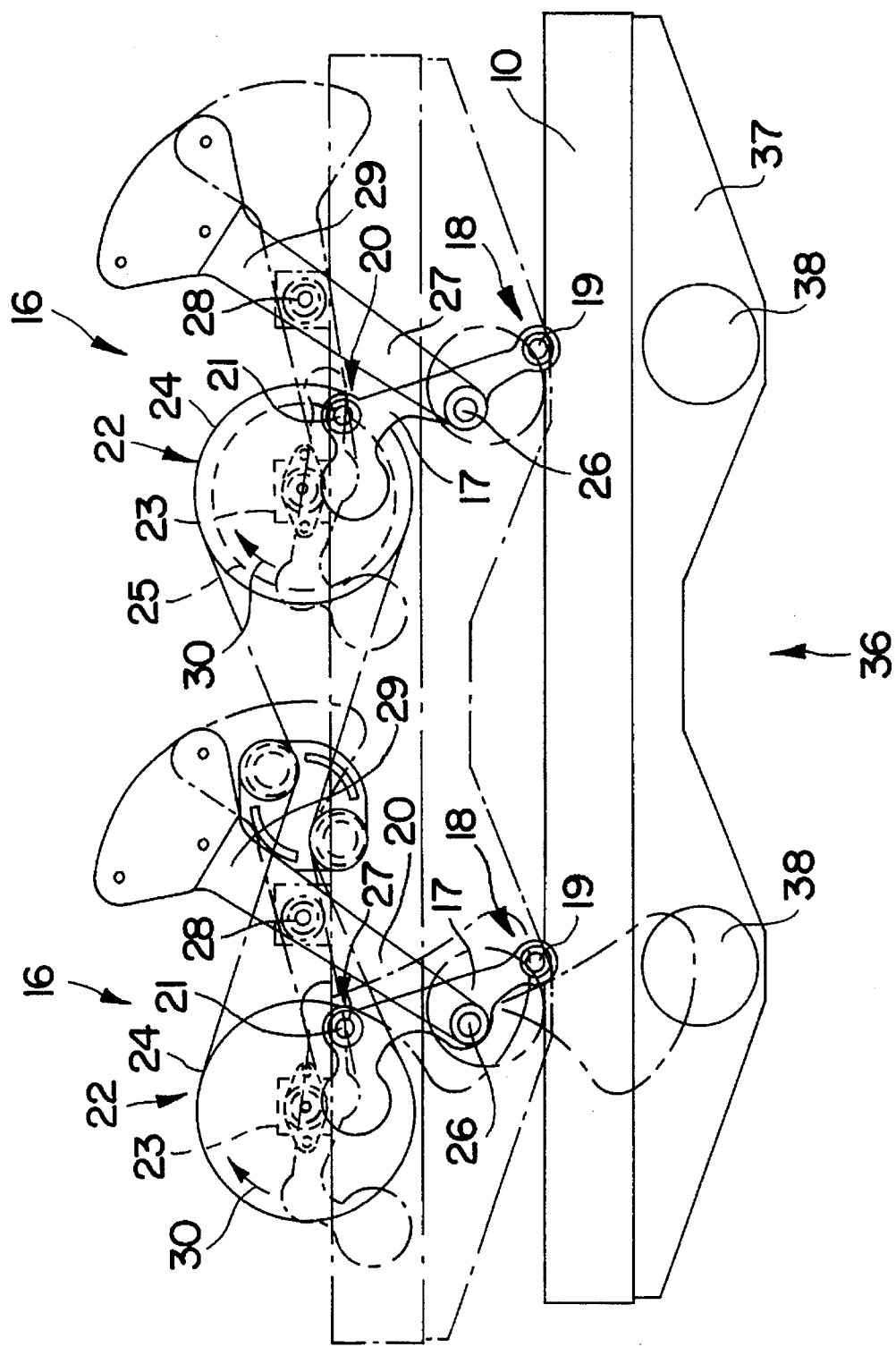
FIG. 4 is a schematic plan view of a transfer device disposed between the first and the second transport system of Fig. 1 according to the preferred embodiment of the present invention.
Figure 5:
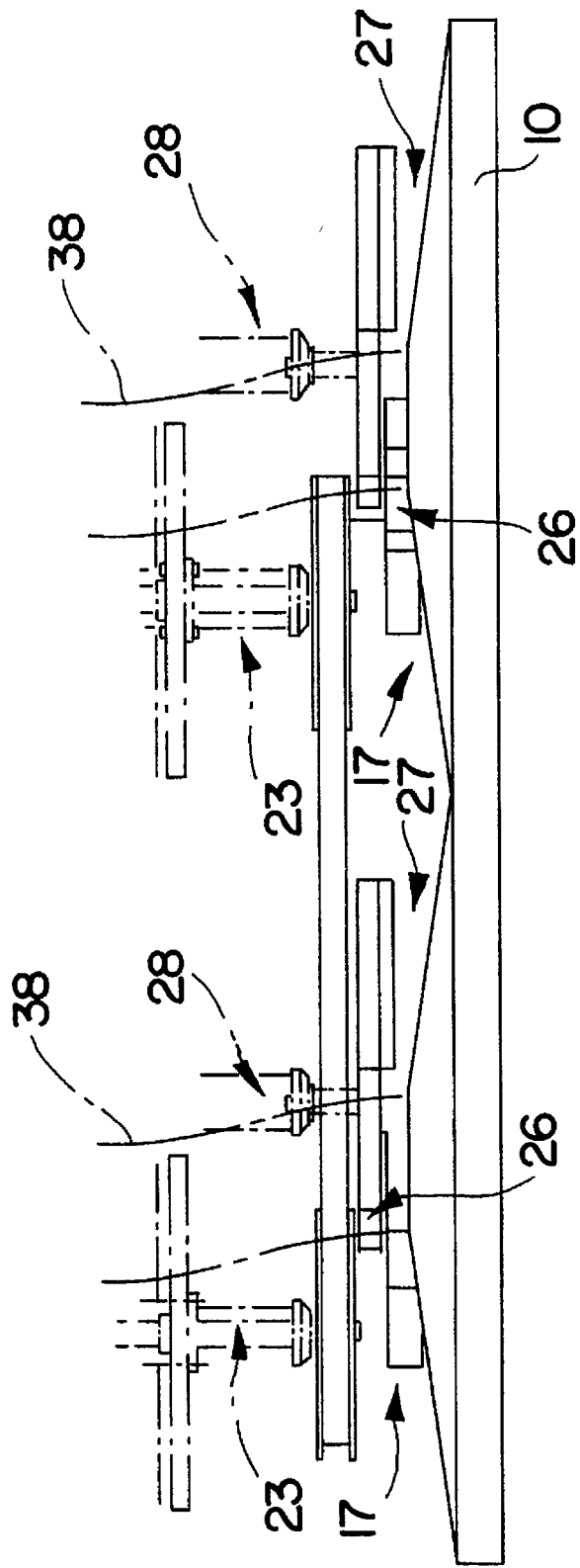
FIG. 5 is an elevational view of the transfer device of FIG. 4.

FIG. 5 representing a lateral view of FIG. 4, as seen from the direction indicated by arrow 36 in FIG. 4, makes it clear that the pickup device 10 has a suction box 37 on its side which is connected via flexible vacuum lines 38 with a vacuum source, not shown, for example a fan. A suction control apparatus 39 (FIGS. 9 and 10) is located in the flow path of the vacuum lines 38 and is used to create the vacuum in the pickup device 10 or to release the vacuum when the products 1 are set down. The vacuum source therefore operates continuously and the application and release of the vacuum is performed by the suction control apparatus 39.

In detail, the suction control apparatus 39 has a cross section 40 which is enlarged in comparison with that of the vacuum line 38, in which a valve plate 41 is disposed, pivotable by virtue of its pivot shaft 42. An actuator arm 43 is connected, fixed against relative rotation, with the pivot shall 42 and leads to the drive crank 22, only schematically indicated in FIG. 9, via a mechanical gear 44, not shown in detail. Because of the drive linkage 16, a synchronous pivot movement of the valve plate 41 therefore takes place, along with the movement of the pickup mechanism 10. This takes place in that, in the holding mode, the cross section of the vacuum line 38 is opened by means of an appropriate positioning of the valve plate 41, so that the products 1 are attracted by suction and are held. When the products 1 are to be deposited, the valve plate 41 is brought into a position via the rod system 44 and the actuator arm 43 where it closes off the vacuum line 38, because of which the suction source is disengaged from the pickup mechanism 10; i.e. the vacuum is reduced there and the products 1 are released. To speed up this release process, a bypass air flap 45 is disposed, fixed against relative rotation, on the pivot shaft 42 and is therefore moved synchronously with the valve plate 41. The bypass air flap 45 cooperates with a ventilation opening 46, which leads to the outside. The apparatus is made such that, during the holding mode, the bypass air flap 45 closes off the ventilation opening 46, so that the vacuum is maintained in the pickup mechanism 10. Nevertheless, when the depositing mode is started, the bypass air flap 45 opens the ventilation opening 46, and the vacuum in the pickup mechanism 10 can be reduced in an extremely short time and the products 1 can be totally released.

Figure 9:
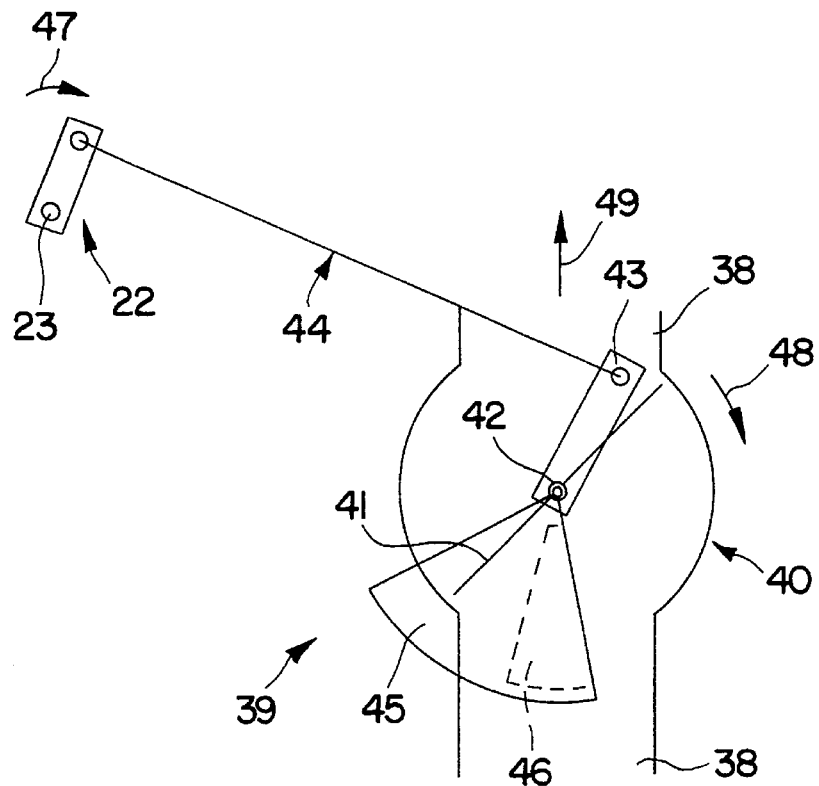
FIGS. 9 and 10 illustrate a suction control apparatus for the transfer device of the preferred embodiment in different operating positions.
Figure 10:
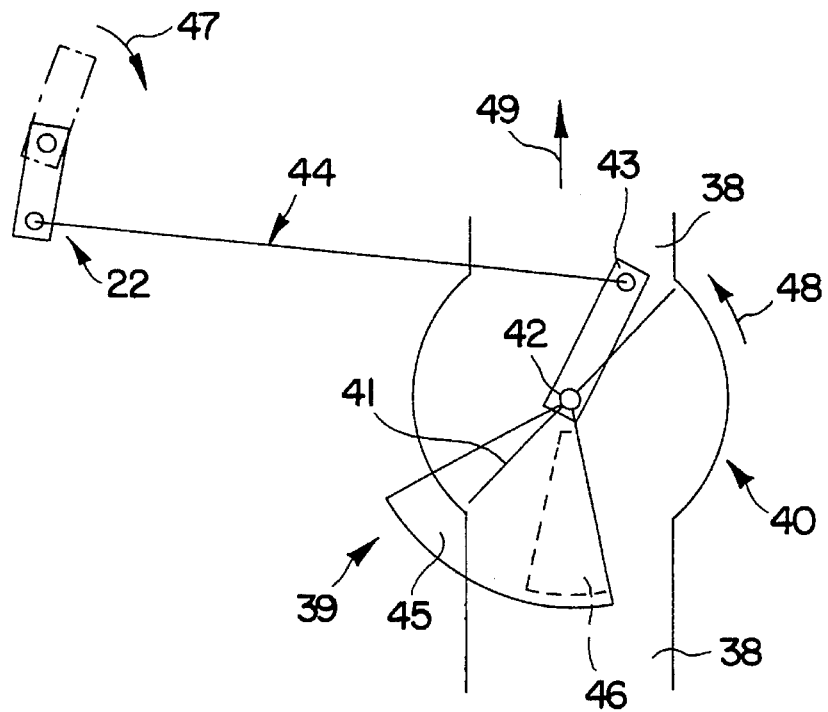

FIGS. 9 and 10 show different positions of the suction control apparatus 39, which can be best seen by means of a comparison of the positions of the drive crank 22. In FIG. 9 the position is that in which the valve plate 41 has just been closed and the bypass air flap 45 is just about to release the ventilation opening 46. The deposit of the products 1 is therefore initiated. FIG. 10 shows the positions of the valve plate 41 and the bypass air flap 45 when the transition to the holding mode has just been started; i.e., when the attraction by suction of the products 1 is to be initiated. The direction of rotation of the drive crank 22 is indicated by means of the arrow 47 in FIGS. 9 and 10. The corresponding direction of rotation of the valve plate 41 is indicated by the arrow 48 and the direction of the air flow for generating the vacuum by the arrow 49.

Figure 11:
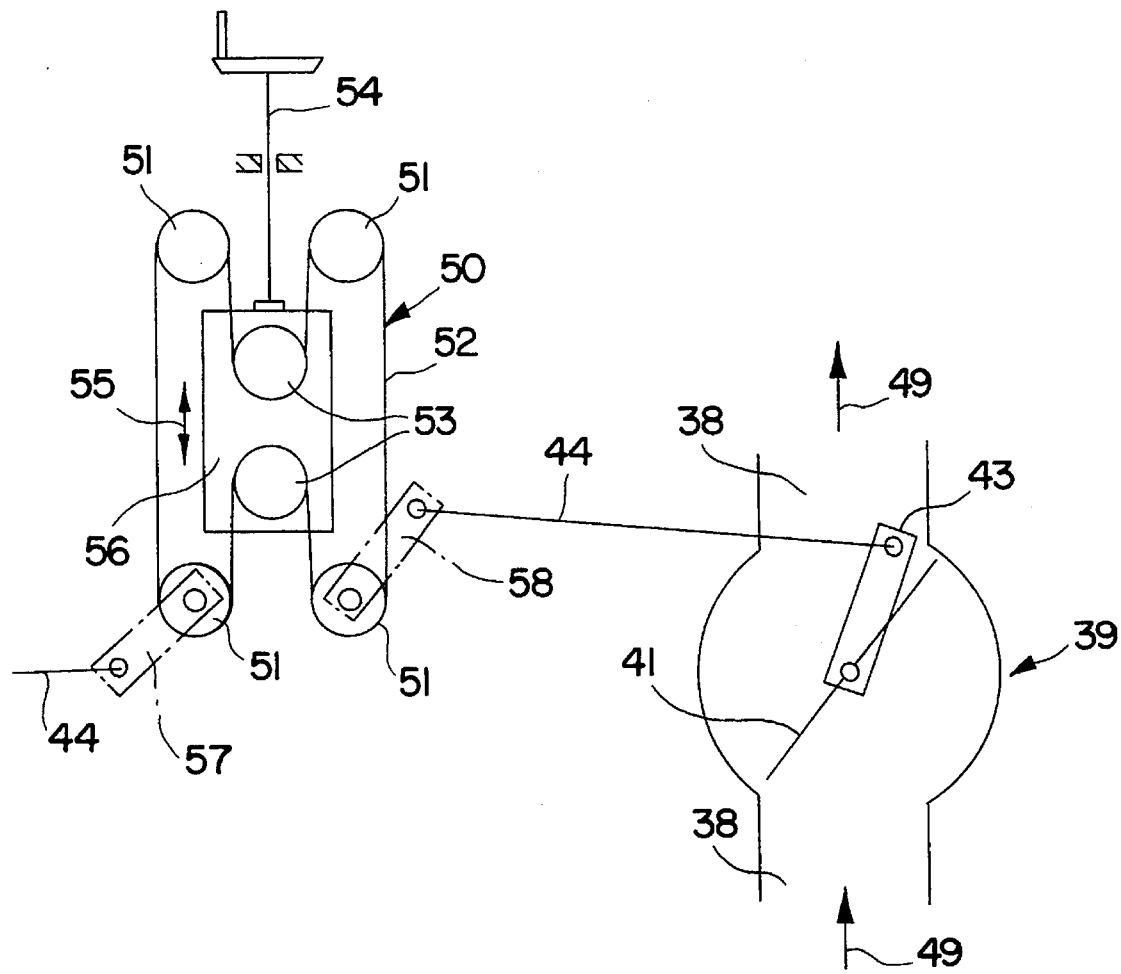
FIG. 11 shows a phase regulating mechanism for the suction control apparatus of FIGS. 9 and 10.

In order to now cause an exact matching of the movement of the pickup mechanism 10 and the control function of the suction control apparatus 39, a phase regulating mechanism 50 is disposed in accordance with FIG. 11 in the area of the mechanical rod system 44. It has four gear wheels 51 disposed in one plane, around which a toothed belt 52 is wound. The toothed belt 52 furthermore runs over two gear wheels 53 disposed on a carriage 56 which can be displaced along the two-headed arrow 55 by means of an adjusting spindle 54. Starting at the gear wheel 51 disposed at bottom left, the toothed belt 52 first extends upward, loops around half of the gear wheel 51 disposed there and then extends downward to loop around the bottom half of the first gear wheel 53 of the carriage 56. From there the toothed belt 52 again runs upward and there half loops around a further one of the mentioned gear wheels 51 and from there extends downward to loop around half of a further gear wheel 51. From there the toothed belt 52 extends upward to the second of the mentioned two gear wheels 53, loops around half of it and then again downward to its starting point, namely the previously mentioned gear wheel 51. The gear wheel 51 disposed at bottom left is connected, fixed against relative rotation, with a lever 57 leading to the rod system 44. The gear wheel 51 disposed at bottom right also has a lever 58 which, in continuation of the rod system 44, leads to the suction control apparatus 39. In an alternate manner it is also possible to connect the gear wheel 51 directly with the wheel 24, for example via an additional toothed belt.

If the adjustment spindle 54 is actuated and the carriage 56 is moved in the direction of the arrow 55 upward or downward by this, and if it is furthermore assumed that the position of the lever 57 and thus of the associated gear wheel 51 has been unchangeably set because of the position of the drive linkage 16, a corresponding rotation of the gear wheels 51 and 53 takes place in such a way that the lever 58 is turned into a position corresponding to the displacement movement of the carriage 56. However, this also changes the position of the valve plate 41, so that a correct setting of the control times of the valve plate 41 is possible.

It is furthermore also within the scope of the invention if the transfer of the products does not take place from the first transport system to the second transport system, but instead the products are moved from the second transport system to the first transport system. This leads to appropriately parallel disposed rows of products of the second transport system being transferred in an endless row to the first transport system, wherein the endless row can be in a single row or, as shown by way of example in FIG. 2, several parallel rows. The occurring movements of the drive linkage are then understood to be in a correspondingly opposite way and are laid out that way. The same applies of course to the suction control apparatus and its triggering, as well as other aspects of system operation.

If the connection of a position of a component of the drive linkage with the suction control apparatus is not desired to be made mechanically, and instead in an alternative manner as an electrical embodiment, it is advantageous if the position of an element of the drive linkage is detected by means of an angle sensor. This angle sensor detects the respectively assumed position of the drive linkage and is connected with an electronic control device which correspondingly triggers an actuator which opens or closes the suction control apparatus, for example the valve plate 41. This operational connection achieved in an electromagnetic manner operates extremely precisely and essentially inertia-free and also permits a very accurate setting in an electrical manner by appropriate offset preselection. In this way it is also possible in a very simple manner to set not only the reversing points, etc., but also the opening and closing times, wherein each individual setting is independent of another.

The above-mentioned angle sensor also permits, in addition to position detection, a speed setting in every operational state, for example at start-up, so that the speeds of the first and second transport systems, as well as the transfer device, are always matched to each other. In this way it is possible to match individual parameters of the total device to each other as a function of the speed, in particular the control points of the suction control apparatus. In this way it is possible, for example, to compensate for idle times in the suction generation; i.e., the switching function becomes independent of the speed.

In FIG. 3, the first transport system runs from the right to the left for removing the products toward the rear by means of the second transport system. If, in accordance with another exemplary embodiment, the first transport system were to convey from the left to the right, the design of the transfer device would have to be made mirror-reversed in respect to the representation in FIG. 4.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A drive linkage for a pickup mechanism of a device for transferring products, in particular aluminum cans, conveyed by means of first and second transport systems, with the products being transferred by the pickup mechanism from the first transport system in a row aligned in the transporting direction of the first transport system to the second transport system with the row disposed transversely with respect to the transporting direction of the second transport system, said pickup mechanism being guided along a movement track by at least one drive linkage, the drive linkage comprising a rotating drive crank, a first arm pivotably connected at one end to a first shaft on the pickup mechanism and at its other end to a second shaft on said rotating drive crank, a second arm pivotably connected to a third shaft on the first arm and pivotably connected to a fourth shaft, said fourth shaft being a stationary shaft, and a first compensating weight disposed laterally of a long extension of the first arm.

2. The drive linkage of claim 1, wherein a second compensating weight is mounted on the second arm.

3. The drive linkage of claim 1, wherein the first compensating weight is disposed on the first arm in the area of the second shaft.

4. The drive linkage of claim 1, wherein the first compensating weight is embodied in the form of a cantilever of the first arm, wherein the cantilever extends transversely to the longitudinal extension of the first arm.

5. The drive linkage of claim 4, wherein the cantilever forms a lateral cantilever of the first arm.

6. The drive linkage of claim 4, wherein the first arm, together with the cantilever, forms an angled arm, wherein the second shaft is disposed in the corner area of the angle.

7. The drive linkage of claim 1, wherein the second arm is extended beyond its fixed, fourth shaft and there supports a second compensating weight.

8. The drive linkage of claim 7, wherein the mass of the first and second compensating weight can be adjusted by adding or subtracting weights.

9. The drive linkage of claim 7, wherein the position of the first and the second compensating weight can be set by adjusting means.

10. The drive linkage of claim 7, wherein the second compensating weight is disposed aligned with the center longitudinal axis of the second arm.

11. The drive linkage of claim 1, wherein the pickup mechanism is embodied as a mechanism attracting the products, in particular, cans, by vacuum.

12. The drive linkage of claim 11, further comprising a suction control apparatus for creating the vacuum for holding the products and for releasing the vacuum when depositing the products.

13. The drive linkage of claim 12, wherein the suction control apparatus is a valve plate disposed in a vacuum line which, in the holding mode, opens the cross section of the vacuum line and in the deposit mode closes the cross section of the vacuum line.

14. The drive linkage of claim 13, wherein the valve plate has a pivot shaft in the center area.

15. The drive linkage of claim 13, wherein the valve plate is disposed in a widened cross-sectional area of the vacuum line.

16. The drive linkage of claim 13, wherein the valve plate is driven by the drive crank or an element cooperating therewith via an operational connection comprising a mechanical rod system.

17. The drive linkage of claim 16, wherein a phase regulating mechanism is disposed in the mechanical rod system.

18. The drive linkage of claim 13, wherein an angle sensor is disposed in a portion of the drive linkage and cooperates with an electronic control device which triggers an actuator operating the suction control apparatus.

19. The drive linkage of claim 13, wherein, upstream of the valve plate, a bypass air flap, which is moved synchronously with it, is disposed which, in the holding mode, closes off a ventilation opening, and in the depositing mode opens the ventilation opening.

20. The drive linkage of claim 19, wherein the valve plate and the bypass air flap are disposed on the same pivot shaft.

* * * * *